United States Patent Office 3,147,129
Patented Sept. 1, 1964

3,147,129
SULFOALUMINATE CEMENT
Thomas C. Armstrong, Jr., Charleston, S.C., and Brooks M. Whitehurst, Richmond, Va., assignors to Socony Mobil Oil Company, Inc., a corporation of New York
No Drawing. Filed Sept. 27, 1960, Ser. No. 58,618
18 Claims. (Cl. 106—109)

This invention relates to improved sulfoaluminate cement compositions which have strengths superior to such cements of the prior art, and to a process for their production.

There are two basic processes which have been used to produce sulfoaluminate cements. British Patent No. 317,783 discloses a method of preparing a sulfoaluminate cement by grinding together high alumina cement and natural gypsum or anhydrite. The product obtained from the process of the British patent was used for a time in French Indo-China, but was abandoned apparently because it proved difficult to control its properties. A French firm, Poliet and Chausson, produced sulfoaluminate cements by the simultaneous burning of gypsum, bauxite and calcium carbonate. Industrial production of the cement was begun using a wet-feed rotary kiln. The process required a large excess of air to reduce the amount of $SO_2$ loss. Under these conditions, a product was obtained which was deficient in $SO_3$ and which contained variable amounts of excess lime (see Proceedings of the Third International Symposium on the Chemistry of Cement, page 584). A deficiency of $SO_3$ is untenable in a sulfoaluminate cement; and the properties of the cement are extremely sensitive to the presence of free lime, a small quantity of which is sufficient to cause its disintegration (see A.S.T.M. Proceedings, vol. 58, page 990).

As stated in The Chemistry of Cement and Concrete (2nd addition (1956), Edward Arnold (London), page 431), it does not appear possible to get the very high strengths at one day, which are characteristic of high alumina cement at ordinary temperatures, from its mixtures with calcium sulfate. There is little doubt that the varying amounts of free lime formed in the Poliet and Chausson process accounted for the erratic nature of their product. Although the process of the British patent is basically different, it is likely that free lime was formed in the high temperature calcination of natural gypsum by the decomposition of calcium carbonate impurities and/or by the decomposition of the calcium sulfate.

It is therefore an object of the present invention to provide a sulfoaluminate cement composition which will have uniform strength properties at all ages, and strengths which are at least comparable to presently known high alumina cements at all ages.

It is a further object to reveal a process for the manufacture of these sulfoaluminate cement compositions which eliminates the erratic nature of their properties, leading to a reproducible product.

Other objects will become apparent from the following description.

We have found that a uniform, high strength sulfoaluminate cement can be prepared by combining a pulverized calcium aluminate slag, and a pulverized substantially neutral anhydrite prepared from natural or by-product gypsum and a suitable additive such as a mixture of sugar, lime and silica. By substantially neutral anhydrite, we mean an anhydrite in which all of the alkali carbon impurities, such as calcium carbonate, have been converted to their insoluble salts. We do not necessarily mean that a pH of 7, as the word neutral generally indicates, will be obtained when anhydrite is slurried in water. Salts such as calcium silicate are usually considered insoluble, but small amounts can dissolve in water. If these salts are present in small amounts, they will raise the pH of the slurry, but normally it will not exceed a pH of 11 when all of the carbonate impurities have been converted. Such salts, however, do not adversely affect the properties of our sulfoaluminate cements.

The slag used has an $Al_2O_3/CaO$ ratio of from 0.5 to 1.25, contains more $Al_2O_3$ than $SiO_2$, usually at least 2 to 1 and must contain fluorine from about 0.25 to 4.0%. The CaO to $Al_2O_3$ ratio is such that the content of $12CaO \cdot 7Al_2O_3$ preferably exceeds the content of $CaO \cdot Al_2O_3$. It may also contain other impurities such as $P_2O_5$, titania, etc. Natural gypsums which contain carbonates or other materials which decompose to form alkaline materials on heating must be treated with a strong acid such as one of those from the group consisting of $H_2SO_4$, $H_2SiF_6$, $H_3PO_4$ and HF prior to calcination at from 1200–2000° F. preferably 1600–2000° F. On the other hand, gypsum which is the by-product of sulfuric acid treatment of lime-containing ores (for example, phosphate rock) needs no strong acid treatment before calcination at the above temperature. Natural gypsum which is free of alkali or alkali-forming material may be used without acid treatment.

In addition to accomplishing the stated objects of the invention, another important feature is that our method produces an expansive cement upon the inclusion of a suitable additive. By expansive cement we mean any cement which shows an increase in measurement at 28 days as compared with the 1 day measurement. Cements formed by mixing the fluorine containing, slowly cooled, calcium aluminate slags and neutral anhydrites, depending upon the additive used, are potentially expansive cements, that is they are capable of expanding to a greater extent during the moist curing period of about 10 days then they shrink during the subsequent drying period, thereby giving an overall expansion. Expansion is caused by additives such as zinc sulfate and sodium bisulfate in amounts within the range from 0.10% to 0.42% based on the weight of the cement solids without substantially reducing the strength properties of the cement. This expansion property is of great value in a variety of situations such as for instance in the production of prestressed or "self-stressed" reinforced concrete structures. It is noted in this connection that the cement hardens sufficiently before the expansion to withstand the strain created by the expansion and thus is capable of stressing the reinforcing element or elements. When expansive properties are desired, the sugar-lime-silica mixture must not be present.

From the above discussion, it is evident that we consider the essence of our invention to be the combination of a fluorine-containing calcium aluminate slag and a substantially neutral anhydrite obtained by calcination of gypsum at 1200–2000° F., said combination having included therein a suitable additive. The type of cement desired, whether non-shrinking or expansive cements of high strengths, will dictate the additive mixture needed. The discovery of an expansive sulfoaluminate cement is particularly important in view of prior art statements that a cement made from calcium sulfate and high alumina cement has no expansive properties. See Chemistry of Cement and Concrete, page 467.

It was unexpected to find that calcium aluminate slags which contain fluorine give with substantially neutral anhydrite sulfoaluminate cements having strengths approximately 160–200% of the cements made from the same slag without fluorine. Also, from the indicated $Al_2O/CaO$ ratios it is seen that dicalcium silicate is one of the possible phases when silica is present to the extent of about 2%–15%. At least the lower amount of silica is always present in the slags which we use in the practice of our invention. When a slag containing the dicalcium silicate phase is cooled slowly, a rapid volume change occurs which causes disintegration of the slag to microscopic sizes. This leads to a difficult handling problem. Fluorine, when present in the proportions given, eliminates slag disintegration.

Fluorine in the slag, then, actually accomplishes two purposes. It prevents disintegration of the slag, and the slag containing it yields a stronger sulfoaluminate cement. We have no explanation to offer for its apparent effect on the sulfoaluminate cement strengths. However, we offer the following explanation for its effect on the disintegration of the slag: Its presence in the slag appears to have the effect of preventing the difficulties attributable to the presence of dicalcium silicate by preventing its formation or crystallization or phase inversion in slag compositions in which the existence of dicalcium silicate is at least theoretically possible.

It is well known that there are two forms of anhydrous calcium sulfate, namely the soluble and insoluble forms. There has never been a distinction made as to the proper form to be used in producing an acceptable, reproducible sulfoaluminate cement. We have found that a slowly hydraytable, neutral anhydrite is formed which overcomes the erratic nature of cements of the prior art if sufficient strong acid is present in or added to the gypsum before it is calcined.

The erratic nature of sulfoaluminate cements made from anhydrite, neutral or not, formed at temperatures of from 400–1200° F. may be caused by the fact that the soluble anhydrite hydrates so rapidly that there is a resultant rapid set of the cement. Anhydrite obtained by calcination at temperatures of from 1200–2000° F. which has not been treated with strong acid prior to calcination also gives erratic cement properties because of the variable amounts of alkaline earth oxides present therein.

It was also known that uncalcined by-product gypsum containing free acids gave poor cements when it was combined with aluminous slags or other types of cement. It was therefore unexpected to find that calcination of by-product gypsum led to a neutral anhydrite which gave improved sulfoaluminate cements upon its combination with pulverized aluminous slags.

The use of additives to control the strength characteristics of sulfoaluminate cements made from fluorine-containing aluminate slags and neutral anhydrite, or, for that matter, sulfoaluminate cements in general, is believed to be new. It is certainly new to use additives in the production of an expansive sulfoaluminate cement.

Cooling rate of the aluminous slag portion of sulfoaluminate cement has a decided effect on the cement's expansive properties. We have found that a quenched fluorine-containing slag will not give a sulfoaluminate cement which exhibits expansive properties even when having included therein any known additive. On the other hand, if the slag is cooled slowly, i.e., from 2600° F. to room temperature in about four hours, a sulfoaluminate cement prepared from it, and having therein a suitable additive, will exhibit expansive properties. We think that one of the reasons why no one heretofore has produced an expansive sulfoaluminate cement is because the manufacturing procedures for producing high alumina cements call for quenching the slags. As stated the cooling rate for the slag i.e., slow cooling or quenching affects the expansive properties of the cement product therefrom but does not materially affect its strength.

The invention discussed above can best be illustrated by the following more specific description of our sulfoaluminate cement and the process we employ for its production.

Examples of suitable approximate calcium aluminate slag compositions or analyses are as follows:

(1) CaO 51.97%, $Al_2O_3$ 35.02%, $SiO_2$ 9.58% $Fe_2O_3$ 0.24%, F 2.98%, $P_2O_5$ 1.44%.

(2) CaO 42.28%, $Al_2O_3+TiO_2$ 48.26%, $SiO_2$ 5.8%, $Fe_2O_3$ 0.28%, $P_2O_5$ 1.08%, F 2.51% and insoluble 0.82%.

(3) CaO 50.57%, $Al_2O_3+TiO_2$ 32.67%, $SiO_2$ 10.82%, $Fe_2O_3$ 1.30%, $P_2O_5$ 2.65%, F 3.35% and insoluble 0.04%.

The slag is cooled slowly, i.e., not quenched, from the fusion temperature to promote crystallization and is ground to a suitable fineness, e.g., from 3000–5000 cm.²/gm. as determined by the ASTM procedure C–204. The slag is understood to be composed mainly of the hydratable compounds $12CaO \cdot 7Al_2O_3$ and $CaO \cdot Al_2O_3$ in varying proportions.

Just by way of illustration, the composition of by-product gypsums from which anhydrites suitable for use in the invention may be made by calcination are as follows:

(1) CaO 31.7%, $SO_3$ 43.8%, $P_2O_5$ 0.8%, $SiO_2$ 1.7%, insol. 2.0%, F 0.7% and total $H_2O$ 19.3%, and (2) CaO 31.3%, $SO_3$ 44.14%, F 0.82%, $P_2O_5$ 1.19%, $Al_2O_3$ 0.16%, $Fe_2O_3$ 0.28%, $SiO_2$ 1.51% and total $H_2O$ 19.78%.

A typical sulfoaluminate cement analyses, disregarding any additive used is as follows:

| | Percent |
|---|---|
| CaO | 46.2 |
| $Al_2O_3$ | 21.1 |
| $SO_3$ | 22.6 |
| $SiO_2$ | 7.3 |
| $Fe_2O_3$ | 0.1 |
| $P_2O_5$ | 0.9 |
| F | 1.8 |

A calculated mineralogical analysis of a suitable sulfoaluminate cement is as follows:

| | Percent |
|---|---|
| $CaO \cdot Al_2O_3$ | 12.9 |
| $12CaO \cdot 7Al_2O_3$ | 23.0 |
| $CaSO_4$ | 38.4 |
| $2CaO \cdot SiO_2$ | 15.8 |
| $3CaO \cdot P_2O_5$ | 1.7 |
| $CaO \cdot TiO_2$ | 2.0 |
| $CaF_2$ | 4.4 |
| Ferrophosphorus | 0.1 |
| Other (probably $SiO_2$) | 1.6 |

The slag and anhydrite generally are mixed, in finely divided form, in the ratio of about 60 parts by weight of the slag to about 40 parts by weight of the anhydrite, although as will appear hereinafter this ratio is not critical and may be varied within a substantial range, e.g., from about 1 to 1 to about 2.5 to 1. A suitable additive is also used in the proper proportions, the type depending on the cement properties desired.

Our preferred additive for use when expansion is not required is a mixture of sucrose, hydrated lime and silica. The composition may vary within a considerable range. Examples of suitable sucrose-hydrated lime-silica mixtures are as follows:

TABLE 1

| | A | B | C | D |
|---|---|---|---|---|
| Percent sucrose | 7.70 | 8.70 | 8.20 | 8.10 |
| Percent hydrated lime | 15.40 | 4.30 | 9.85 | 11.25 |
| Percent silica | 76.90 | 87.00 | 81.95 | 80.65 |

Mixtures containing the three ingredients within the ranges indicated by these examples may be used.

This composition or these compositions when used as additives may be used in varying amounts, a suitable range being from 1.0% to 3.2% calculated upon the weight of the sulfoaluminate cement. They are adequate retarders, but do not cause appreciable expansion, and even tend to neutralize the expansive action of other additives such as zinc sulfate and sodium bisulfate which have the ability in the presence of other retarders of producing expansion.

Another suitable additive which is useful as a retarder and permits some expansion is a composition available under the trade name "Plastiment," which is believed to be a composition from a group consisting of tartaric acid, citric acid, saccharic acid, and tetrahydroxyadipic acid. Another additive which is an adequate retarder and also permits expansion is calcium lignin sulfonate, which is available under the name "Maracon A." This retarder must be used with care in order to avoid excessive entrainment of air in the cement-water mixture.

Borax is a known retarder for aluminous cements and is usable in the cement of the present invention when expensive properties are not desired.

Zinc sulfate, sodium acid sulfate and ammonium sulfate are all inadequate as retarders, but all give expansive properties to the cement. No single additive is at present known which is an adequate retarder, and also gives expansive properties. It is therefore expedient when expansive properties are desired to use two additives, i.e., one such as zinc sulfate, sodium acid sulfate or ammonium sulfate which confers expansive properties, and another such as calcium lignin sulfonate or Plastiment which serve as retarders and do not prevent or neutralize the expansive effect.

Examples of cement compositions and their properties in accordance with the invention and of compositions outside of the scope of the invention are given in the following tables.

TABLE 2

*Slag Compositions*

| | Slag A | Slag B | Slag C | Slag D | Slag E | Slag F | Slag G | Slag H | Slag I |
|---|---|---|---|---|---|---|---|---|---|
| CaO | 53.0 | 42.10 | 50.89 | 42.38 | 51.97 | 50.6 | 45.12 | 50.47 | 46.09 |
| $Al_2O_3$ | 29.0 | 45.84 | 33.48 | 48.26 | 35.20 | 38.8 | 42.90 | 38.91 | 41.28 |
| $SiO_2$ | 13.0 | 6.24 | 9.41 | 5.80 | 9.58 | 10.6 | 5.88 | 6.16 | 6.66 |
| F | 3.5 | 2.76 | 3.29 | 2.51 | 2.98 | 0 | 2.69 | 2.51 | 2.60 |
| $P_2O_5$ | 1.5 | 1.73 | 2.73 | 1.08 | 1.44 | 0 | 1.45 | 1.45 | 1.25 |
| $Fe_2O_3$ | | 1.55 | 1.00 | 0.28 | 0.24 | 0 | 0.67 | 0.40 | 0.48 |
| Insol | | 0.72 | 0.34 | 0.82 | 0.58 | | 0.60 | 0.12 | 0.14 |

Slags A, F, G, H and I of the foregoing Table 2 were made by mixing the materials in the ratios indicated, fusing at 2600° F. and cooling slowly. The $P_2O_5$ and F components were supplied in the form of $Ca_3(PO_4)_2$ and $CaF_2$ respectively.

Slag B of the foregoing table 2 was made in an electric phosphorus reduction furnace from a burden of 100 parts by weight of Florida hard rock phosphate (containing 34.81% $P_2O_5$, 49.57% CaO, 5.27% $SiO_2$, 3.66% F, 0.73% $Al_2O_3+TiO_2$, 0.52% $Fe_2O_3$, 2.44% $CO_2$ and 0.39% moisture), 60.90 parts by weight of Suriname bauxite (containing 94.16% $Al_2O_3+TiO_2$, 3.97% $SiO_2$ and 1.20% $Fe_2O_3$) and 18.81 parts by weight of coke (containing 86.00% fixed C, 5.32% $SiO_2$, 3.37% $Al_2O_3+TiO_2$, 0.75% CaO and 1.48% $Fe_2O_3$), and was cooled slowly.

Slag D of the foregoing table 2 was made in an electric phosphorus reduction furnace from a burden of 100 parts by weight of Florida phosphate rock (containing 36.40% $P_2O_5$, 50.50% CaO, 0.77% $Al_2O_3+TiO_2$, 4.20% $SiO_2$, 0.168% $Fe_2O_3$, 3.49% F, 2.40% $CO_2$ and 0.40% $H_2O$), 64 parts by weight of bauxite (containing 93.17% $Al_2O_3+TiO_2$, 5.33% $SiO_2$, 1.22% $Fe_2O_3$ and 1.00% $H_2O$) and 19.25 parts by weight of coke (containing 88.50% fixed C, 2.48% $SiO_2$ and 0.60% $H_2O$), and was cooled slowly.

Slags C and E were made in an electric reduction furnace from burdens consisting of 100 parts by weight of Florida phosphate rock, 36 to 37 parts by weight of bauxite, 19.25 parts by weight of coke and from 1¼ to 4 parts by weight of $SiO_2$, the phosphate rock, bauxite and coke having the compositions described above for slag D. These slags were cooled slowly also.

TABLE 3

*Gypsum Compositions From Which Anhydrite Was Made*

| | Gypsum A by-product | Gypsum B by-product | Gypsum C Natural |
|---|---|---|---|
| CaO | 31.7 | 32.8 | 32.5 |
| $SO_3$ | 43.8 | 44.5 | 46.1 |
| $P_2O_5$ | 0.8 | 2.1 | 0 |
| $SiO_2$ | 1.7 | 0.6 | 1.6 |
| Insol | 2.0 | 0.5 | 0.8 |
| F | 0.7 | 0.9 | 0 |
| Total $H_2O$ | 19.3 | 18.6 | 17.0 |

In the foregoing Table 3 the anhydrites were made by calcining the gypsums at about 1600° F., i.e., dead burned.

TABLE 4

*Sulfoaluminate Cement Strength Using Treated Natural Gypsum C Which Has Been Calcined at 1600° F.*

| Treating agent used | Component to be studied | Amount of component to be studied, percent | Type slag | Ratio slag to anhydrite | Additive mixture used | Amount of additive mixture, percent | Compressive strength | | |
|---|---|---|---|---|---|---|---|---|---|
| | | | | | | | 1 day | 7 day | 28 day |
| None | None | None | E | 1.5 | C | 2.4 | 2,463 | 3,950 | 4,750 |
| $H_3PO_4$ | $P_2O_5$ | 0.10 | E | 1.5 | C | 2.4 | 3,213 | 6,287 | 6,750 |
| $H_3PO_4$ | $P_2O_5$ | 0.25 | E | 1.5 | C | 2.4 | 4,300 | 6,463 | 7,775 |
| $H_3PO_4$ | $P_2O_5$ | 0.50 | E | 1.5 | C | 2.4 | 5,100 | 7,450 | 8,525 |
| $H_3PO_4$ | $P_2O_5$ | 1.00 | E | 1.5 | C | 2.4 | 4,975 | 7,775 | 9,125 |
| $H_3PO_4$ | $P_2O_5$ | 2.00 | E | 1.5 | C | 2.4 | 2,900 | 8,763 | 9,750 |
| $H_3PO_4$ | $P_2O_5$ | 3.00 | E | 1.5 | C | 2.4 | 2,850 | 8,650 | 9,750 |
| $H_3PO_4$ | $P_2O_5$ | 5.00 | E | 1.5 | C | 2.4 | 2,750 | 7,500 | 8,750 |
| $H_2SiF_6$ | F | 1.0 | E | 1.5 | C | 2.4 | 3,163 | 7,075 | 8,050 |
| $H_2SiF_6$ / $H_3PO_4$ | F / $P_2O_5$ | 1.0 / 1.0 | E | 1.5 | C | 2.4 | 2,688 | 7,113 | 8,550 |
| $H_2SO_4$ | $SO_3$ | 1.73 | E | 1.5 | C | 2.4 | 5,425 | 7,500 | 8,675 |
| $H_2SO_4$ | $SO_3$ | 2.46 | E | 1.5 | C | 2.4 | 5,000 | 7,813 | 8,400 |
| $H_2SO_4$ | $SO_3$ | 3.20 | E | 1.5 | C | 2.4 | 4,400 | 7,063 | 8,300 |

TABLE 5

| Type slag | Ratio slag to anhydrite | Additive mixture used | Amount of additive used, percent | Sulfoaluminate cement strength with anhydrite from gypsum A | | | |
|---|---|---|---|---|---|---|---|
| | | | | 1 day | 3 day | 7 day | 14 day |
| C | 2.33 | B | 1.4 | 0 | 6,310 | 6,387 | 7,618 |
| C | 1.86 | B | 1.3 | 2,078 | | 4,232 | 5,771 |
| C | 1.5 | B | 1.2 | 2 day (3,078) | 7,541 | 7,310 |
| C | 1.22 | B | 1.1 | 2,078 | | 5,540 | 5,848 |
| C | 1.0 | B | 1.0 | 1,539 | | 5,310 | 6,849 |
| E | 1.5 | C | 2.4 | 2,713 | 5,088 | 6,125 | 7,283 |

TABLE 6

| Type slag | Ratio slag to anhydrite | Additive mixture used | Amount of additive used, percent | Sulfoaluminate cement strength with anhydrite from gypsum B | | | | | |
|---|---|---|---|---|---|---|---|---|---|
| | | | | 1 day | 3 day | 4 day | 7 day | 14 day | 28 day |
| A | 1.50 | D | 3.2 | 2,933 | | | 5,250 | | |
| C | 2.33 | B | 1.4 | 3,078 | | | 4,770 | 5,387 | |
| C | 1.86 | B | 1.3 | 2,616 | | | 5,387 | 5,771 | |
| C | 1.5 | B | 1.2 | 1,924 | | | 6,156 | 7,002 | |
| C | 1.22 | B | 1.1 | 0 | | 4,540 | 5,540 | 5,771 | |
| C | 1.0 | B | 1.0 | 0 | | 3,771 | 4,617 | 4,925 | |
| B | 2.33 | A | 1.4 | 0 | | 4,617 | 5,233 | 6,925 | |
| B | 1.86 | A | 1.3 | 0 | | 4,386 | 5,694 | 7,310 | |
| B | 1.5 | A | 1.2 | 0 | | 3,924 | 5,771 | 6,772 | |
| B | 1.22 | A | 1.1 | 1,539 | | | 3,463 | 4,617 | |
| B | 1.0 | A | 1.0 | 1,308 | | | 3,848 | 4,463 | |
| B | 1.5 | C | 2.4 | 3,292 | | | 6,458 | | 7,367 |
| F | 1.5 | C | 2.4 | 3,100 | | | 4,300 | | 5,550 |
| F | 1.5 | None | None | 2,750 | | | 4,100 | | 4,150 |
| E | 1.5 | C | 2.4 | 3,650 | 6,175 | | 7,875 | | 8,967 |
| D | 1.65 | A | 1.25 | 1,025 | | 7,700 | 8,000 | | |
| C | 1.5 | D | 3.2 | 4,400 | 6,100 | | 7,592 | | 8,467 |
| E | 1.5 | D | 3.2 | 4,825 | | | 6,750 | | 7,825 |
| C | 1.5 | Borax | 0.25 | 2,900 | | | 7,600 | | 8,875 |
| G | 1.45 | C | 2.4 | 5,500 | | | 8,300 | | 9,050 |
| H | 1.22 | C | 2.4 | 2,450 | | | 6,525 | | 8,675 |
| I | 1.45 | C | 2.4 | 4,225 | | | 8,150 | | 9,188 |

TABLE 7

| Type slag | Ratio slag to anhydrite | Additive mixture used | Amount of additive used, percent | Sulfoaluminate cement strength with anhydrite from gypsum C | | | |
|---|---|---|---|---|---|---|---|
| | | | | 1 day | 7 day | 14 day | 28 day |
| C | 2.33 | B | 1.4 | 2,308 | 4,617 | 5,002 | |
| C | 1.86 | B | 1.3 | 2,539 | 4,232 | 5,166 | |
| C | 1.5 | B | 1.2 | 2,078 | 4,463 | 4,694 | |
| C | 1.22 | B | 1.1 | 2,539 | 4,848 | 5,002 | |
| C | 1.0 | B | 1.0 | 2,539 | 4,617 | 5,310 | |
| E | 1.5 | C | 2.4 | 2,463 | 3,950 | | 4,750 |

As stated previously we have found that the presence of fluorine in the aluminous slag portion of our sulfoaluminate cement is one essential feature of the improvement of strength properties. In Table 6, Example 13 shows that when a fluorine-free slag is combined with a substantially neutral anhydrite, and 2.4% of additive C, the resulting cement has a strength of only 5550 p.s.i. at 28 days which is only 62% of that obtained with fluorine-containing slag E, and substantially neutral anhydrite, with 2.4% of additive C (Example 15). Example 14, Table 6 shows the cement made from the same components as Example 13 except that the additive was omitted. The strength of Example 14 is only 46% of that shown in Example 15. It should be noted that slags E and F of Examples 13, 14 and 15 had similar compositions.

As we have indicated another essential feature of our invention is the combination of a substantially neutral anhydrite with a fluorine-containing aluminous slag. Examples shown in Table 4 illustrate the criticality of the sulfoaluminate cement strength vs. the neutrality (as defined before) of the anhydrites prepared from acid-treated natural gypsum. Examples 1 through 5, Table 4 have all been treated with insufficient acid to neutralize the alkalis present, however, the amount of free alkali decreases from Examples 1 to 5. The gypsum of Example 6, Table 4 was stoichiometrically neutralized before calcination, whereas Examples 7, 8, and 13 contained an excess amount of acid for neutralization.

Example 1 shows that when natural gypsum is calcined at 1600° F. to form anhydrite which contains free alkali and this anhydrite is mixed with slag E, and 2.4% of additive C, the resultant sulfoaluminate cement has only 48.5% of the strength obtained when using natural gypsum C which has been treated with sufficient acid to yield a substantially neutral anhydrite when calcined at 1600° F. (Example 6). Examples 1 thru 6 serve to illustrate how the cement properties gradually improve as the alkali impurities are neutralized. Also they offer an explanation for the erratic nature of similar cements of the prior art.

Examples 7, 8, and 13, Table 4, show that even when excess acid is used to neutralize any of the alkaline components of the gypsum, a substantially neutral anhydrite is obtained, which on combination with fluorine containing aluminous slag gives a high strength sulfoaluminate cement. Examples 9, 10, and 11, Table 4 show that neutrality and the accompanying improvement of properties can be achieved by $H_2SiF_6$, a mixture of $H_2SiF_6$ and $H_3PO_4$, and $H_2SO_4$.

The anhydrites used for the examples in Tables 5 and 6 were prepared by the calcination of acidic by-product gypsums at 1600° F. As expected, the anhydrites were substantially neutral even though the gypsums from which they were formed contained free acid. Therefore, all of the cements in Tables 5 and 6 which were prepared by the combination of a fluorine-containing aluminous slag with a substantially neutral anhydrite prepared from acidic by-product gypsum A and B, show the improved properties of the invention.

Examples 1 thru 5 of Table 5, and Examples 2 thru 6 of Table 6 show the range of slag-to-anhydrite ratios which will yield improved cements. Examples of Table 6 excepting 13 and 14 show how the composition of a fluorine-containing slag can vary simultaneously with the slag-to-anhydrite ratio, and still yield sulfoaluminate cements of superior strength.

Another essential feature of our invention is the inclusion of a suitable additive. It has been found that sulfoaluminate cements prepared by combining an aluminous slag containing fluorine with a neutral anhydrite also require an additive to permit the attainment of uniform, high-strength properties. As seen in Example 1, Table 4, the combination of our preferred non-expansive additive with an alkaline anhydrite does not overcome the deleterious effect of this alkali. As seen in Examples 13 and 14, Table 6, the inclusion of our preferred non-expansive additive in sulfoaluminate cement prepared from a fluorine free aluminous slag and a substantially neutral anhydrite results in only a minor improvement in strength. From these results, it is evident that the inclusion of our disclosed additives had an unexpected and beneficial effect on sulfoaluminate cement strength properties.

Table 7, Examples 1 thru 5, further illustrates the deleterious effect of the presence of free alkalis in the anhydrite. This table shows that the deleterious effect of these free alkalis is independent of both the slag to anhydrite ratio and the amount of additive used.

The sulfoaluminate cement of the present invention is useful for all of the purposes for which known sulfoaluminate cements are used, but it has several distinct and unforeseen advantages over previously known cements, as will be pointed out hereafter.

As to strength, it has been shown by comparative tests that at the same concentration, e.g., 7 bags of cement per cubic yard of concrete, it gives a considerably stronger concrete structure than the same concentration of Portland cement at all testing periods up to 28 days. For instance, at 28 days concrete formed from a seven bag mix of the sulfoaluminate cement showed a compressive strength of about 7400 p.s.i.g. (6 inch x 12 inch cylinder) as compared to strengths of 4300 and 5100 p.s.i.g., respectively, for type II and type III Portland cement mixes. Even a 5 bag concrete mix of the sulfoaluminate cement gave a greater strength at all periods of testing than 7 bag mixes of the type II and type III Portland cements, i.e., 6100 p.s.i.g. as compared with 4300 and 5100, respectively, at 28 days. In these tests about 2.4% of the sucrose-hydrated lime-silica additive disclosed above was used in the sulfoaluminate cement.

The sulfoaluminate cement of the present invention with sucrose-hydrated lime-silica additive was tested over an 8 month period in comparison with type III Portland cement to determine the effect of exposure to normal, and both moist and dry curing conditions at 100° F. The tests were made on 7-bag concrete. The sulfoaluminate cement showed a higher compressive strength under all three conditions (normal, moist and dry) for all test periods up to 8 months than the Portland cement.

Comparative tests were made of the expansive properties of the sulfoaluminate cement of the present invention with different additives. The additives used and the results obtained are shown in the following table.

TABLE 8

| Additive | Percent retained expansion after 28 days in dry air | Compressive strength, 28 days |
| --- | --- | --- |
| 2.4% sugar-lime-SiO$_2$ | +0.058 | 7,150 |
| 0.416% ZnSO$_4$·7H$_2$O | +0.681 | 7,650 |
| 0.416% NaHSO$_4$·H$_2$O | +0.462 | 6,100 |

The sugar-lime-SiO$_2$ additive shown in the foregoing table contains 8.20% sucrose, 9.85% Ca(OH)$_2$ and 81.95% SiO$_2$ (2500 to 4000 cm.$^2$/gm. Blaine) and was made by mixing the ingredients, forming a paste thereof with water, drying below 100° C. and pulverising.

The sulfoaluminate cement in each test attained its maximum expansion regardless of whether it was cured in a humidity chest or under water, in about 7 days, and then shrank very slightly (about 0.03%) in dry air. As stated above the expansion of the cement lags behind the strength development of the cement, and this property is useful for instance in making self-stressed reinforced concrete. Tests show that the amount of expansion varies not only with the kind of additive used, but also with the amount of additive used. It is noted that the expansion in the case of the sugar-lime-SiO$_2$ additive is practically nil, but that there is no shrinkage.

Other observations made as a result of extensive tests carried out on the sulfoaluminate cement and normal Portland cement are that (1) the workability of the sulfoaluminate cement compares favorably with that of the Portland cement and (2) much higher compressive strengths are obtained with the sulfoaluminate cement than with the Portland cement.

As stated above, the sulfoaluminate cement of the present invention does not require the use of water in excess of that required for hydration to give a workable mortar. Calculations indicate that about 58% of water is required for hydration, but tests show that a mortar of adequate plasticity and workability is obtained in 6 to 7 bag/yd.$^3$ concrete mixtures with a water to cement ratio of 45 to 50%. This may explain the low drying shrinkage of the cement.

It is noted that the sugar-lime-SiO$_2$ additive referred to above is a good grinding aid and may be added to the calcium aluminate slag before or during the grinding thereof. The cement properties are the same whether this additive is added before, during or after grinding.

In making the calcium aluminate slag-anhydrite mixture, they preferably are mixed at about the same degree of fineness, e.g., the aluminous slag may be at 3500 cm.$^2$/gm. (Blaine) and the anhydrite at 4500 cm.$^2$/gm. (Blaine).

The color of the preferred cement composition, i.e., that which is made of a mixture of by-product slag and by-product anydrite, generally is very light and adapted for tinting to make colored concrete, but it cannot be considered as being a white cement.

The calcium aluminate by-product slag used in the sulfoaluminate cements of the present invention has been tested for use in plaster by substituting pulverized gypsum for the anhydrite and has been found to give a plaster similar to the well known gypsum plaster (plaster of Paris), but having a much greater strength.

As has been stated above, and as is shown by the data given in the tables, sulfoaluminate cements made with anhydrite from by-product gypsum from the manufacture of phosphoric acid are superior to similar sulfoaluminate cements made with anhydrite made from untreated native gypsum.

Theoretically, since the strength of sulfoaluminate cements is attributed to their contents of $$3CaO \cdot Al_2O_3 \cdot 3CaSO_4 \cdot 32H_2O$$

it appears that the slag and the anhydrite should be mixed, depending upon their compositions, to give a mixture capable of giving the maximum content of this compound. This has proved to be correct and although usable cements may be made by mixing the slag and anhydrite in ratios which depart somewhat from this formula, it has been found that the ratio 60 to 40 generally gives substantially maximum strength. Slags having relatively low Al$_2$O$_3$ to CaO ratios generally give best results.

We claim:

1. A uniform, high-strength, sulfoaluminate cement composition consisting essentially of a mixture of (a) pulverized calcium aluminate slag having an Al$_2$O$_3$/CaO ratio of from 0.5 to 1.25, an Al$_2$O$_3$/SiO$_2$ ratio of at least 2 to 1, and containing from 0.25 to 4.0% fluorine and (b) a pulverized substantially neutral calcined calcium sulfate, which has been calcined at a temperature of from 1200 to 2000° F., said slag to anhydrite weight ratio being from about 1:1 to about 2.5 to 1.

2. The sulfoaluminate cement composition defined in claim 1 wherein said pulverized calcined calcium sulfate is natural gypsum free from alkali and alkali-forming materials.

3. The sulfoaluminate cement composition defined in claim 1 wherein said pulverized calcined calcium sulfate is by-product gypsum formed by the sulfuric acid treatment of lime-containing ores.

4. The sulfoaluminate cement composition defined in claim 1 wherein said pulverized calcined calcium sulfate is natural gypsum which has been treated with an acid to remove alkaline-forming materials contained therein prior to calcination.

5. The sulfoaluminate cement composition as defined in claim 1 wherein said cement composition contains 60 parts by weight of said slag and 40 parts by weight of said anhydrite.

6. A uniform, high-strength, sulfoaluminate cement composition consisting essentially of a mixture of (a) pulverized calcium aluminate slag having an Al$_2$O$_3$/CaO ratio of from 0.5 to 1.25, an Al$_2$O$_3$/SiO$_2$ ratio of at least 2 to 1, and containing from 0.25 to 4.0% fluorine and (b) a pulverized substantially neutral calcined calcium sulfate, which has been calcined at a temperature of from 1200 to 2000° F., said slag to calcium sulfate weight ratio being from about 1:1 to about 2.5 to 1 and (c) a sufficient amount of an additive selected from the group consisting of zinc sulfate, sodium bisulfate, and ammonium sulfate to maintain said cement in expanded form.

7. The expansive sulfoaluminate cement as defined in claim 6 wherein said additive is present in an amount of from 0.1–0.42% by weight of said cement.

8. A uniform, high-strength, sulfoaluminate cement composition consisting essentially of (a) pulverized calcium aluminate slag having an $Al_2O_3/CaO$ ratio of from 0.5 to 1.25, an $Al_2O_3/SiO_2$ ratio of at least 2 to 1, and containing from 0.25 to 4.0% fluorine and (b) a pulverized substantially neutral calcined calcium sulfate which has been calcined at a temperature of from 1200 to 2000° F., said slag to calcium sulfate weight ratio being from about 1:1 to about 2.5 to 1, and (c) a sufficient amount of a retarder additive for retarding the rate of setting of said cement.

9. The cement composition as defined in claim 8 wherein said retarder consists essentially of a mixture of from 7.7 to 8.7% sucrose, from 4.3 to 15.4% hydrated lime, and from 76.9 to 87% silica.

10. The cement composition defined in claim 9 wherein said sucrose-hydrated lime-silica retarder is present in an amount of from 1 to 3.2% by weight of the sulfoaluminate cement composition.

11. The cement composition as defined in claim 8 wherein said retarder is a member selected from the group consisting of tartaric acid, citric acid, saccharic acid, and tetrahydroxyadipic acid, and mixtures thereof.

12. The cement as defined in claim 8 wherein said retarder is calcium lignin sulfonate.

13. The cement as defined in claim 8 wherein the retarder is borax.

14. A process for forming a uniform, high-strength, sulfoaluminate cement composition consisting essentially of the steps of (a) forming a molten calcium aluminate slag and permitting said slag to cool at a rate sufficient to promote crystallization therein (b) pulvering said slag, said pulverized calcium aluminate slag having an $Al_2O_3/CaO$ ratio of from 0.5 to 1.25 and $Al_2O_3/SiO_2$ ratio of at least 2 to 1, and containing from 0.25 to 4% fluorine, (c) pulverizing substantially netural calcium sulfate which has been calcined at a temperature of from 1200–2000° F., and (d) mixing said pulverized slag with said pulverized calcium sulfate, said slag to calcium sulfate weight ratio in said cement composition being from about 1:1 to about 2.5 to 1.

15. The process as defined in claim 14 wherein said cement composition contains 60 parts by weight of said slag and 40 parts by weight of said anhydrite.

16. The process as defined in claim 14 wherein said substantially neutral calcium sulfate is formed by treating it, prior to calcination, with an acid which removes alkaline-forming materials contained in said gypsum.

17. The process as defined in claim 14 wherein said substantial neutral calcium sulfate is natural gypsum which is free from alkali and alkali-forming materials.

18. The process as defined in claim 14 wherein said substantially neutral calcium sulfate is the by-product of the sulfuric acid treatment of lime-containing ores.

References Cited in the file of this patent

UNITED STATES PATENTS

| | | |
|---|---|---|
| 2,859,124 | King | Nov. 4, 1958 |
| 2,937,926 | Hanusch | May 24, 1960 |
| 2,947,643 | Kamlet | Aug. 2, 1960 |
| 3,024,123 | Theilacker | Mar. 6, 1962 |

FOREIGN PATENTS

| | | |
|---|---|---|
| 949,789 | France | Feb. 28, 1949 |
| 317,783 | Great Britain | Aug. 28, 1930 |
| 513,897 | Great Britain | Oct. 25, 1939 |
| 513,898 | Great Britain | Oct. 25, 1939 |